United States Patent [19]
Kobata

[11] Patent Number: 6,058,418
[45] Date of Patent: *May 2, 2000

[54] MARKETING DATA DELIVERY SYSTEM

[75] Inventor: Hiroshi Kobata, Brookline, Mass.

[73] Assignee: E-Parcel, LLC, Newton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/801,458

[22] Filed: Feb. 18, 1997

[51] Int. Cl.$^7$ ............................................. G06F 13/00
[52] U.S. Cl. ................... 709/221; 709/220; 709/221; 709/224; 709/223; 709/247; 709/248; 709/249; 709/229
[58] Field of Search ................. 395/200.32, 200.47, 395/200.48, 200.53, 200.54, 200.59, 200.5, 200.51, 200.52; 709/202, 220, 221, 222, 247, 248, 249, 223, 224, 229

[56] References Cited

U.S. PATENT DOCUMENTS

| | | | |
|---|---|---|---|
| 5,421,009 | 5/1995 | Platt | 709/221 |
| 5,758,072 | 5/1998 | Filepp et al. | 395/200.5 |
| 5,845,090 | 12/1998 | Collins, III et al. | 395/200.51 |
| 5,878,384 | 3/1999 | Johnson et al. | 702/187 |

*Primary Examiner*—Viet D. Vu
*Assistant Examiner*—Hiev C. Le
*Attorney, Agent, or Firm*—Fish & Richardson P.C.

[57] ABSTRACT

In an Internet-based client/server application, a system is provided which detects demographics of a client including CPU power, hard disk space, applications installed, network connectivity and log-in history so as to provide this infrastructure related information detailing client usage of the Internet to the service provider. In one embodiment, each user is provided with software having a unique serial number. Having the serial number, infrastructure data is checked at the client side and reported to the server periodically, with the server updating a database with the infrastructure data from each PC. In one embodiment, the database is filtered by factors such as location of the client and an indication of which providers delivered software to a client. After filtering, the service provider can obtain various demographics such as the demography of hard disk space, CPU power and viewers. In one embodiment, the demographics are used at the server to automatically select the contents to be transmitted to the particular client. Thus the provider can send the most appropriate contents to the most appropriate client based on demographic information of the client's infrastructure.

22 Claims, 4 Drawing Sheets

MARKETING DATA DELIVERY SYSTEM

FIELD OF INVENTION

This invention relates to the provision of data over the Internet and, more particularly, to a system for ascertaining the demography of the users of the Internet.

BACKGROUND OF THE INVENTION

With the increased usage of the Internet comes the problem of deciding how and where to direct the information from the provider's point of view. With the advent of so-called "push" systems in which providers have direct access to the PC at the client side in a client/server application, it is increasingly important that the provider be provided with information so as to be able to direct the services to those users who are most likely to be interested.

In the past, the only type of demographic information that was available was to "guess" the usage of the system through use of sampling research data. In systems in which sampling research data is involved, a given research company will ask a major provider how many pieces of software were sold to the various users. Based on the data of the sales of the enabling software, the research company, utilizing mathematical techniques, provides demographic information to the provider based on a series of assumptions about the user.

However, the utilization of statistics alone based on the sales of software, for example, is not at all accurate in terms of providing the provider with targeted information as to the "real" demography of the user or client. For instance, it is impossible through statistics alone based on a single input such as sales to derive information relating to the CPU size and speed at the user, hard disk space availalle, information relating to the network connection such as dial-up cable modem connection information and ISDN connections, a list of the inventories indicating the applications running on the particular computer involved, as well as peripherals such as sound cards connected to the computer at the client side. Moreover, there is no way to ascertain the log-in history for each of the Internet users, such that critical information for the providers is not existent.

Critical information which is not available from traditional research is infrastructure information for a particular PC, such as CPU power, viewer, sound card and Internet connection information.

What is meant by the term "viewer" is what type of protocol is being run on the machine such as MPEG, QUICKTIME, AVI, and PDF.

The sum total of this infrastructure information would be useful for the decision maker at the provider as to decide whether or not, for instance, it is worth the money to make 3 megabytes of MPEG video available for advertising based on the above infrastructure demography. Thus, it is impossible for this decision maker to ascertain whether the Internet advertisement delivery will be efficient and worth enough to justify the cost, much less, for instance, providing an Internet video advertisement, the cost of which must be justified by assuring a number of targeted viewers for the subject matter of the video advertisement.

SUMMARY OF THE INVENTION

In order to provide such needed data to a content provider that wants to use the Internet connection, in one embodiment, client software is installed at each PC which can detect the infrastructure of the PC. The software which is provided by the provider to the user enables sensing CPU power, hard disk space, the applications running or installed, network connectivity and the log-in history. Since each client software has a unique serial number, sensing the serial number at the server side provides for rapid transfer and loading of a database with infrastructure data which is reported to the server periodically, for instance, every two seconds. At the server side, the database can be updated frequently to provide instant demographics of the particular user. It will be appreciated that the database can be filtered by such factors as location so that the provider can be apprised of what locations would be most interested in the content that the provider wishes to transmit. This permits the provider to be able to limit the broadcast of the data to selected locations.

It will be noted that the client software is delivered by the provider to the end user. By so doing, each provider is apprised of its own members, thus to provide the provider with the demographics of its own members or subscribers. This enables the content providers to be able to decide the content size to be delivered, as well as the viewer software, and makes the decision as to how much and what should be provided to an individual user tailored to the particular user's requirements.

For instance, in one operative embodiment, if a provider wants to make a two minute commercial, this can take as much eight megabytes to transmit. At this point, the provider must select what type of viewer software is required to play the eight megabytes of information, whether it is MPEG, QUICKTIME: or some other format. By this manner, the provider can ascertain in real time whether or not the hard disk space is available at the user.

The distribution curve that is generatable through the utilization of the subject system, permits a bell curve to be formed in which hard disk space can be presented in terms of the number of users. Assuming that 8 megabytes is required, it can be determined what percentage of the channels are occupied by the information to be transmitted, and thus the number of PC's that are available to receive the intended transmission. If, for instance, 8 megabytes represent 80% of the channels, then the provider may well be advised that there is a sufficient number of PCs that can receive the information to commit the resources to providing the content and transmitting it.

As will be appreciated, the subject system permits the content provider to make a decision as to whether or not to invest in a given project based on real-time demographics of users connected to the Internet. Note that in general, demographics are from members of the provider since the provider provides the client software to the end user. As a result, not only can content be tailored to the audience which could receive it, but critical decisions can be made as to whether to provide the content at all based on real-time sensing of the demography of the users.

The result is that by use of the subject system, providers can make business decisions such as the size of the video message, the viewer of the video/audio message, and the timing for hyper-advertisements through pulling or pushing at appropriate times. The subject system also makes possible other decisions which are critical to the economic utilization of the Internet. Furthermore, the demographic information permits marketing decisions as to where to sell the software and hardware based on the infrastructure data and the destination of the PC, namely its IP address.

In summary, in an Internet-based client/server application, a system is provided which detects demographics of a client including CPU power, hard disk space, applications installed, network connectivity and log-in history so as to provide this infrastructure related information detailing client usage of the Internet to the service provider. In one embodiment, each user is provided with software having a unique serial number. Having the serial number, infrastructure data is checked at the client side and reported to the server periodically, with the server updating a database with the infrastructure data from each PC. In one embodiment, the database is filtered by factors such as location of the client and an indication of which providers delivered software to a client. After filtering, the service provider can obtain various demographics such as the demography of hard disk space, CPU power and viewers. In one embodiment, the demographics are used at the server to automatically select the contents to be transmitted to the particular client. Thus the provider can send the most appropriate contents to the most appropriate client based on demographic information of the client's infrastructure.

Moreover, having derived the above demographic information, in one embodiment, an automatic selection system uses the demographics to provide specially tailored contents to the client. Files can thus be tailored to the client's ability to receive the file or even as to what content should be delivered. Thus whether full frame video should be sent, whether audio should be sent, or indeed what format is appropriate can be selected.

BRIEF DESCRIPTION OF THE DRAWINGS

These and other features of the subject invention will be better understood taken in conjunction with the Detailed Description in conjunction with the figures of which.

DETAILED DESCRIPTION

Figure 1:
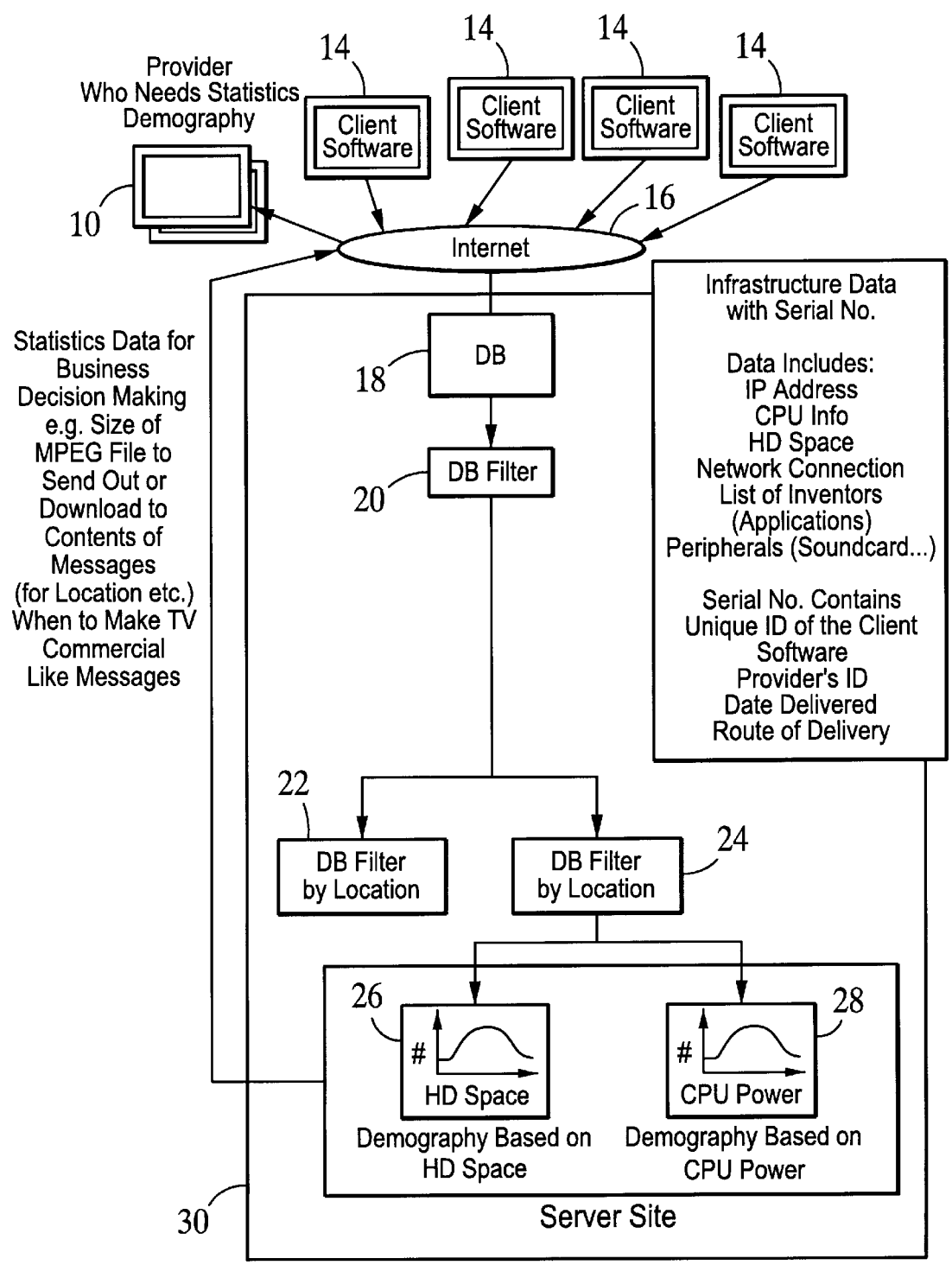
FIG. 1 is a block diagram of the subject system illustrating the ability to provide a database with real-time demographic information from the users, along with a filter system to be able to tailor the demographic output to be the most useful to the provider.

Referring now to FIG. 1, in the subject system, a provider 10 provides software to each of clients 14 which causes the associated computer connected to the Internet to transmit not only a serial number, but also the IP address, CPU information, hard disk space, network connection, a list of inventories, peripherals such as sound cards, and the log-in history associated with each individual client. Client and server are connected via the Internet, here diagrammatically illustrated at 16.

The information is passed to a database 18 at the provider which, optionally, is provided with a database filter 20 so that the data may be filtered as to location as illustrated at 22 or is further filtered by the provider as illustrated at 24. It will be appreciated that there are other filter functions that can be applied to the database for the filtering of the statistics garnered by the subject system.

If, as illustrated, the statistics come from members of the provider because the provider provides the client software, then the provider is provided with information relating to his members and his members alone.

The data, when retrieved, may be in the form of a graph 26 of hard disk space versus number of CPU's or, alternatively, can be provided in terms of CPU power as illustrated at 28, with the information being developed at the server side, here illustrated at 30, and with the information from the server side being delivered to the provider after it has been derived.

Figure 2:
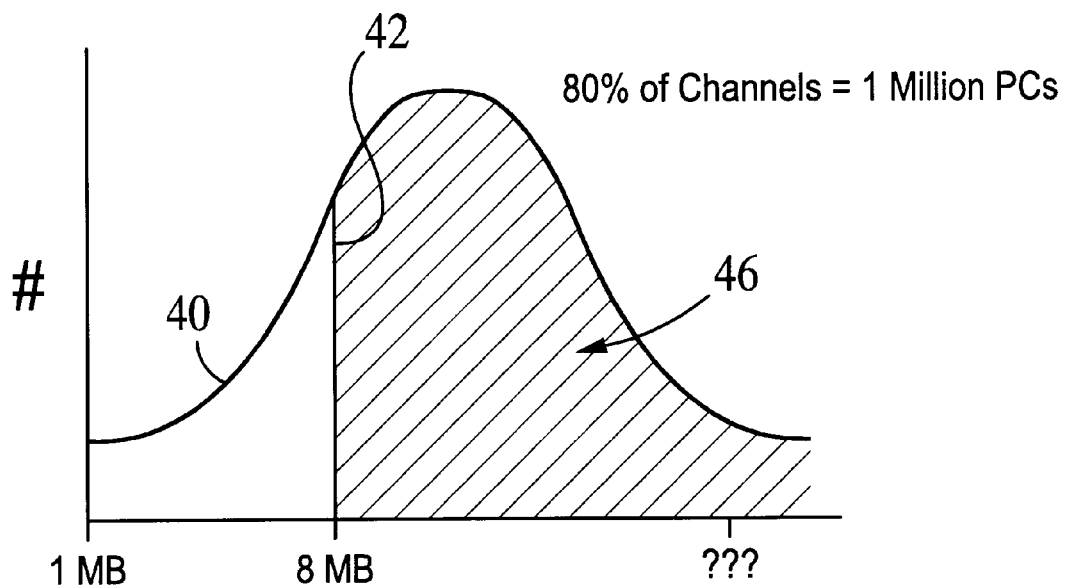
FIG. 2 is a graph illustrating the results of the subject system in which hard disk space is graphed against the number of users.

Referring now to FIG. 2, a graph is shown of hard disk space versus the number of users which, as will be appreciated, is developed in a bell shaped curve 40 with one end of the curve illustrating the number of users having only 1 kilobyte of disk space and with the other end reflecting 1 gigabyte of disk space. As mentioned hereinbefore, it can be seen that with 8 megabytes of information to be transmitted as illustrated by line 42, shaded area 46 represents approximately 80% of the channels and thus, in one instance, over a million PC's having the capability of receiving 8 megabyte transmissions. From this graph, a decision maker can decide that it is worth the time, effort and money to invest in the aforementioned two minute advertising sequence, with the graph giving the provider an instant view of his audience.

Figure 3:
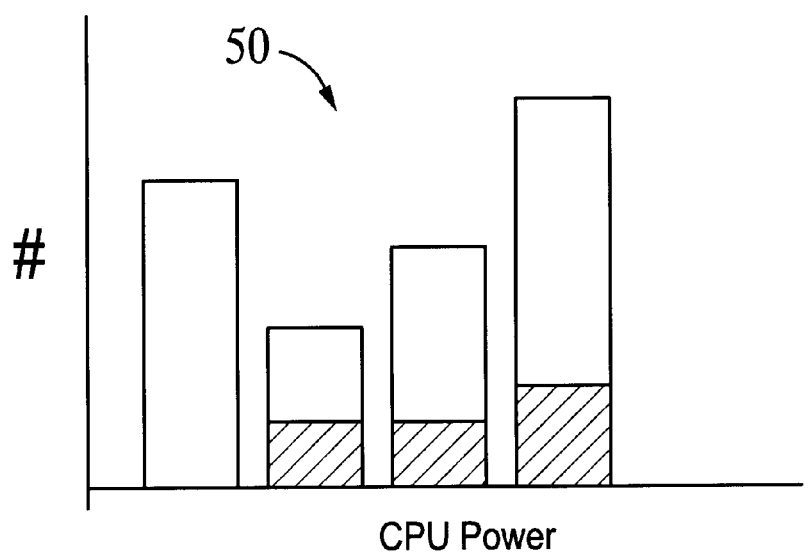
FIG. 3 is a bar graph illustrating CPU power as a function of the number of users.

Referring now to FIG. 3, what is shown is a bar graph 50 which charts CPU power versus number of CPU's, knowing computer power can lead to deductions about peripherals. For instance, one can deduce whether or not there is a sound card associated with a given PC. Thus in terms of CPU power, one can deduce- if there is a 155 megahertz 486 processor installed, and/or if a sound card is in existence, because such computers usually come with a sound card installed. This being the case, it can be assumed that multimedia transmissions can be handled by such a CPU.

Additionally, not only will the providers be provided with information regarding the capability of the particular CPU to receive multimedia transmissions, these user's are also a very good target for the sales of sound cards. As a result, messages advertising sound cards can be sent directly only to those users which have sufficient CPU power.

In general, the client software is delivered along with applications software by the provider and is transparent to the user. At the provider's election, data relating user's identity can be inhibited so that the system is a pure anonymous demographics system. The system can be made anonymous simply by sensing only the IP address of the user as opposed to the user's identity. Thus, while the user's identity remains anonymous, his buying habits and usage create a powerful tool to direct advertising and other content to the user based on his prior usage, the ability of a CPU to receive the intended message and other factors. Note, however, that providers may seek to provide targeted advertisement and content to a particular user, assuming that the provider has the user's permission to do so.

Figure 4:
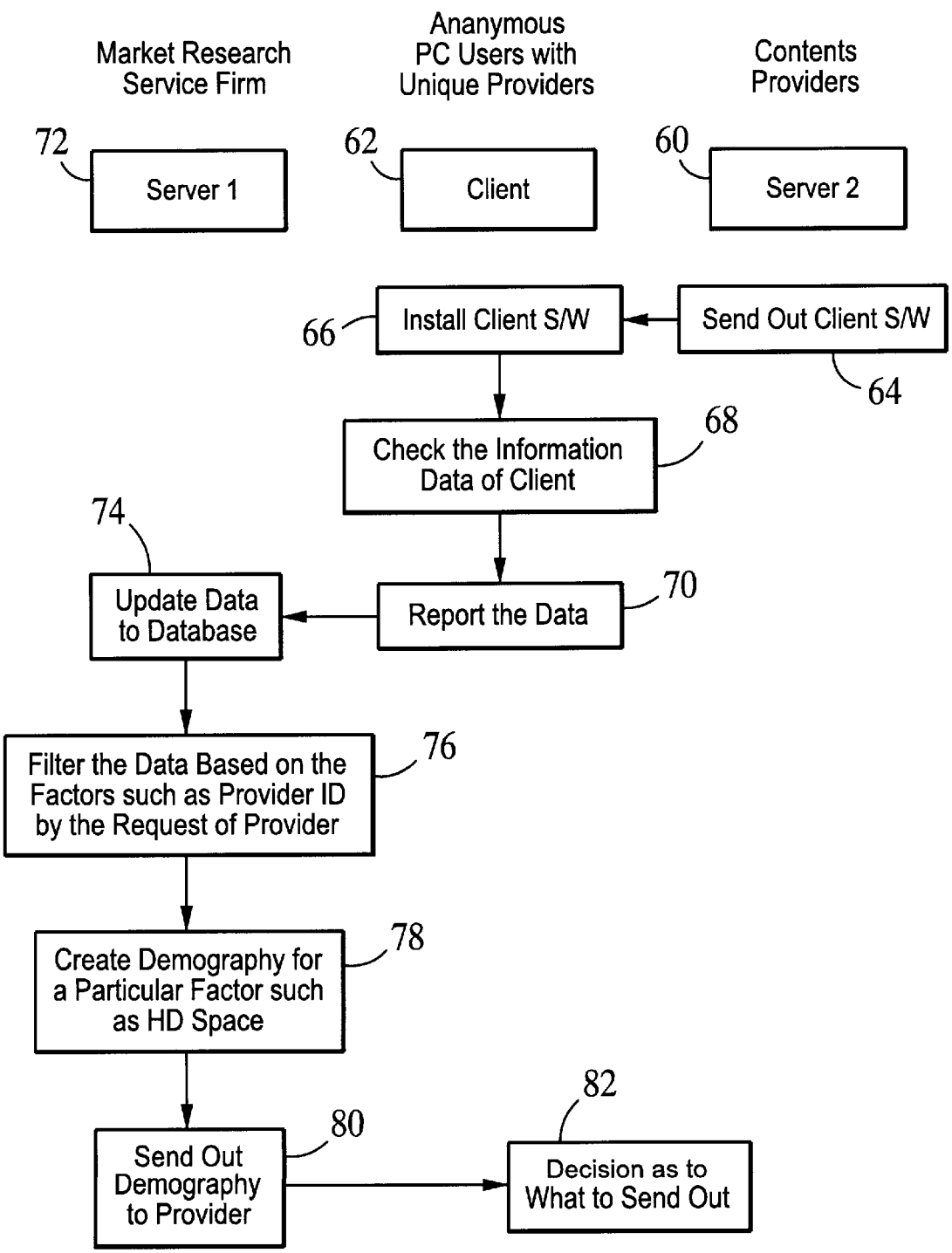
FIG. 4 is a block diagram and flow chart illustrating one embodiment of the subject system indicating client-initiated data reporting based on client-installed software from the provider; and, FIG. 5 is a block diagram of the use of the demographic information for automatic delivery selection by the server.

Referring now to FIG. 4, a flow chart is presented in which server 2, here illustrated at 60, sends out to client 62 a client software package 64 which is installed as illustrated, at 66 at the client's PC. The software checks the infrastructure data of the client as illustrated at 68 and reports the data as illustrated at 70 through the Internet through server 1, here illustrated at 72, which updates the data to its database as illustrated at 74. The output of the database is filtered at 76 based on functions such as provider ID or other factors. The filtered data is used at 78 to create a demography for the particular filtered factor such as hard disk space.

As illustrated at 80, the result of the demography is provided to provider by sending this demography to server 60 such that a decision maker 82 relying on data from Server 2 can make the appropriate decisions as to what to send out, e.g. 4 MB MPEG, 300 kB PDF etc.

Figure 5:
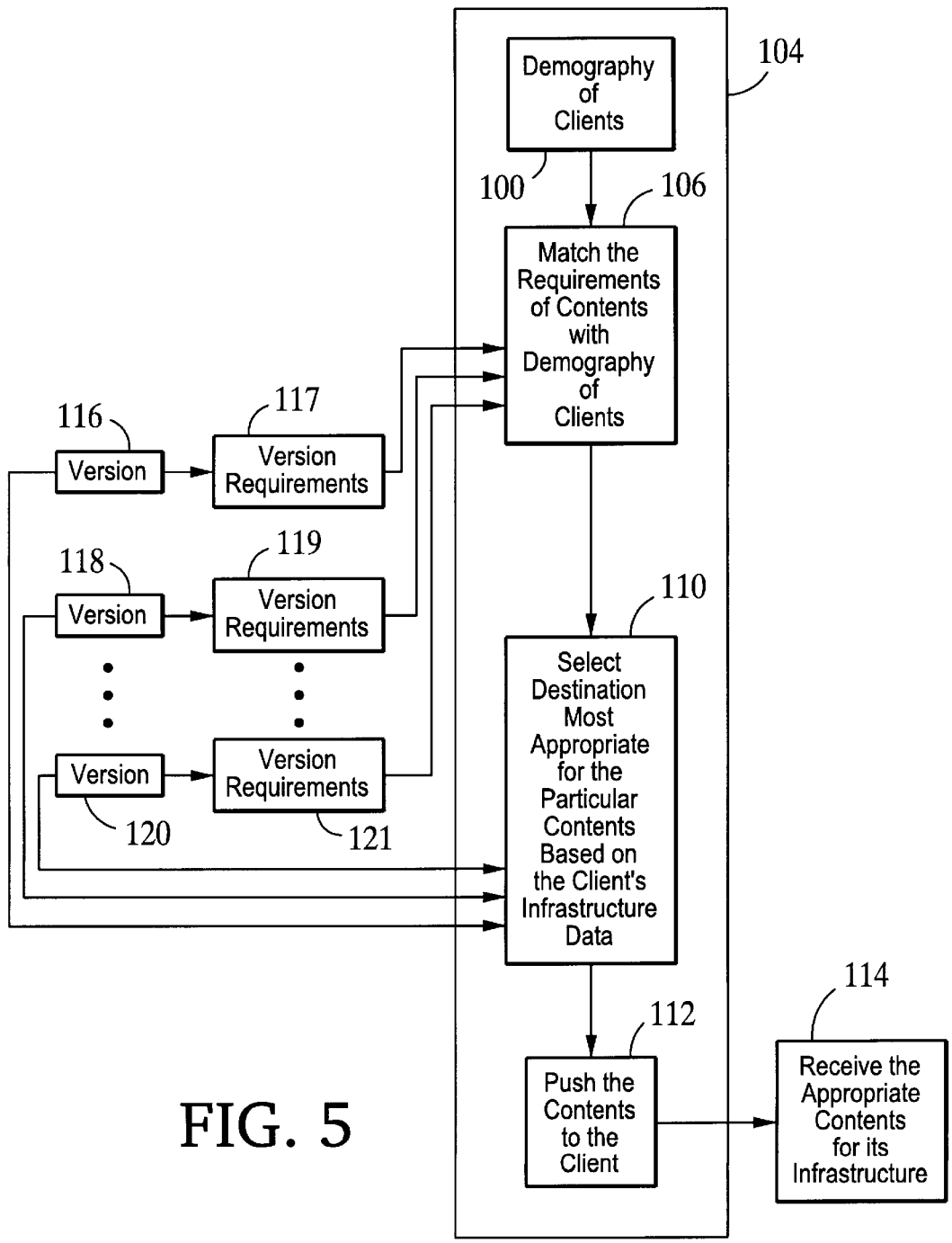

Referring now to FIG. 5, having derived the infrastructure demographies of a client's PC, it is possible to tailor the contents and delivery from a server to a given client in a so-called "push" system. First, based on log-in history, hard disk space and a variety of factors such as available as demography 100, a content provider can decide whether the proposed content would be suitable to the infrastructure of the client. Based on infrastructure information relating to actual use of a client's PC, including applications previously run, it is possible to ascertain the user's willingness or receptiveness to receiving the proposed content. Thus the content need only be pushed to users who in all likelihood would welcome receipt.

Additionally, it is possible for the content provider to have several different versions of the content. One version might require MPEG compatibility and a sound card. Another version might be a reduced file size or just a document.

As can be seen from FIG. 5, an automatic delivery system 104 is provided which selects the destination of the contents based on the ability of a client to receive a given version of the contents. This is done by matching the requirements of the particular version of the contents with the demography of the client as shown at 106. Assuming only one version 116 of the contents, version requirements 117 for this version are matched at module 106 with the infrastructure of the clients. For those clients having infrastructure which can handle the particular version, destination selection module 110 switches version 116 to the appropriate clients.

Thus, upon a match, selection module 110 selects the destinations most appropriate for particular version of use the contents, at which time the version 116 is transmitted directly to the client's PC in a push operation as illustrated at 112.

The result is the receipt of a version appropriate for the infrastructure of the particular client as illustrated at 114.

As mentioned above, for contents available in different versions, it is possible to select from different versions of the contents, here shown at 118 and 120, in order to match the pushed version to the client's infrastructure.

Each version has a set of corresponding version requirements 119 and 121. These version requirements are supplied to matching module 106 which determines not which clients can receive a given version, but rather which versions can be sent to which clients. Selection module 110 then couples the appropriate version to the appropriate clients in a push operation.

What is now presented is a series of programs and C++ with the first of the programs being that which is provided to the client to query his particular PC and with the second program illustrating the retrieval of the data, the creation of the demography, and the transmission of the demography over the net to the server associated with the content provider:

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A system for delivering content to a client system, the system for delivering content comprising:
    a service provider in electrical communication with the client system; and
    software transmitted to the client system from the service provider, the software ascertaining infrastructure-related information regarding the client system when the client system executes the software, the service provider selecting content to transmit to the client system in response to the configuration of the client system as indicated by the infrastructure-related information ascertained by the software.

2. The system of claim 1 wherein the client system includes a processor (CPU) and wherein sad infrastructure-related information includes the power of the CPU at said client system.

3. The system of claim 1 wherein the client system includes a hard disk and wherein said infrastructure-related information includes the hard disk space available at said client system.

4. The system of claim 1 wherein said client system includes applications installed therein and wherein said infrastructure-related information includes the identity of the applications installed in said client system.

5. The system of claim 1 wherein said client system includes a modem having a predetermined bandwidth connected thereto and wherein said infrastructure-related information includes the speed of said modem.

6. The system of claim 1 wherein said client system maintains a log-in history and wherein said infrastructure-related information includes the log-in history of said client system.

7. The system of claim 1 wherein said software has a unique serial number associated therewith and wherein said infrastructure-related information includes said serial number.

8. The system of claim 7 wherein the service provider maintains anonymity of said client system.

9. The system of claim 1 further comprising;
    a second client system in electrical communication with the service provider, the service provider transmitting software to the second client system, such software ascertaining infrastructure-related information regarding the second client system when the second client system executes such software; and
    a selection module selecting to which of the client systems, if any the content is to be transmitted in response to the configuration of each client system as indicated by the infrastructure-related information ascertained for each of the client systems.

10. The system of claim 9 wherein said service provider has multiple versions of the content to be transmitted to each selected client system and wherein said selection module selects one of the versions for transmission to each selected client system based on the configuration on of that client system to receive that selected version.

11. The system of claim 10 wherein that version selected is the most complex possible for receipt by that client system.

12. The system of claim 9 wherein said selection module determines whether each of the client systems is a member of the service provider, the service provider transmitting said content only to said members.

13. The system of claim 1 further including means at said service provider for controlling when sad client system transmits said infrastructure-related at information to said service provider.

14. The system of claim 1 further comprising:

a database storing the ascertained infrastructure-related information; and a filter for selecting portions of the infrastructure-related information stored in the database according to parameters provided by the service provider; and a display device for displaying the selected portions of the infrastructure-related information.

15. A system for delivering content to a plurality of client systems comprising:

a server;

software delivered by the server to each of the client systems, the software determining infrastructure-related information regarding each of the client systems when that client system executes the software;

a data structure storing the infrastructure-related information that is determined by each of the client systems; and a selection module determining from the infrastructure-related information stored in the data structure whether a configuration of each client system is capable of processing content, the server selecting content to transmit to each client system based upon the determined capability of that client system.

16. In a network including a server in electrical communication with a client system, a method for providing content to the client system, comprising the steps of:

providing software from the server to the client system, the software determining infrastructure-related information of the client system when executed by the client system;

executing the software at the client system to ascertain infrastructure-related information regarding the client system;

transmitting the ascertained infrastructure-related information from the client system to the server; and selecting content to transmit to the client system based upon the configuration of the client system as indicated by the infrastructure-related information.

17. The method of claim 16 further comprising the steps of:

building a database with the infrastructure-related information transmitted from the client system to the server;

filtering the database to select portions of the infrastructure-related information; and displaying the selected portions of the infrastructure-related information.

18. The method of claim 16 wherein the infrastructure-related information of the client system is selected from the group consisting of processing power, hard disk capacity, identities of installed applications, modem speed, log-in history, and serial numbers of software delivered to the client system.

19. The method of claim 16 further comprising the step of maintaining anonymity of the client system.

20. The method of claim 16 further comprising the step of selecting one of multiple versions of the content based on whether the configuration of the client system is capable of processing that version of the content.

21. The method of claim 16 firer comprising the steps of:

determining whether the client system is a member of a service provided by the server; and transmitting the content to the client system if the client system is a member.

22. The method of claim 16 further comprising the step of controlling by the server when the client system transmits the infrastructure-related information to the server.

\* \* \* \* \*